United States Patent [19]

Johnson et al.

[11] Patent Number: 4,687,162
[45] Date of Patent: Aug. 18, 1987

[54] APPARATUS FOR SUPPORTING AN AIRCRAFT GUIDE TRACK FOR A MOVABLE AIRFOIL

[75] Inventors: Edward N. Johnson; Miloslav Puncoch, both of King County, Wash.

[73] Assignee: The Boeing Company, Seattle, Wash.

[21] Appl. No.: 748,749

[22] Filed: Jun. 25, 1985

[51] Int. Cl.$^4$ .............................................. B64C 9/02
[52] U.S. Cl. .................................. 244/213; 244/214; 244/215
[58] Field of Search ............... 244/213, 214, 215, 216, 244/217, 210, 211, 212

[56] References Cited

U.S. PATENT DOCUMENTS

| | | | |
|---|---|---|---|
| 2,433,617 | 12/1947 | Marsilius | 164/118 |
| 2,584,614 | 2/1952 | Rasmussen et al. | 287/54 |
| 2,704,682 | 3/1955 | Davis | 287/126 |
| 2,878,042 | 3/1959 | Trimble | 287/54 |
| 2,947,556 | 8/1960 | Wenger | 287/58 |
| 2,999,706 | 9/1961 | Wilcox . | |
| 3,175,455 | 3/1965 | Reddy | 85/75 |
| 3,501,183 | 3/1970 | Stratienko | 287/52.06 |
| 4,068,858 | 1/1978 | Harrison et al. | 280/289 R |
| 4,092,080 | 5/1978 | Bradley, Jr. | 403/319 |
| 4,181,280 | 1/1980 | Bowman | 248/405 |
| 4,218,156 | 8/1980 | Logan | 403/320 |

Primary Examiner—Trygve M. Blix
Assistant Examiner—Rodney Corl
Attorney, Agent, or Firm—Hughes & Cassidy

[57] ABSTRACT

An adjustable support assembly for an aircraft leading edge guide track. The support assembly includes an upper portion pivotally connected to the guide track, and a threaded shaft having a rotatable member threadably engaged thereto which extends through the top of a trunnion housing. The rotatable member includes a shoulder portion which is disposed beneath the trunnion housing, and which is engaged by a wedge member therebelow to support the slat track via the shaft. Rotation of the rotatable member along the shaft adjusts the height of the guide track. The wedge member is supported by a horizontal shaft connected to the aircraft wing and to the housing. The wedge member includes opposing side portions which extend downwardly and inwardly, and which are engaged by complementary surfaces of locking tubes disposed about the horizontal shaft. The locking tubes are adapted for inward movement against the wedge member to cause upward movement of the wedge member against the rotatable member to sandwich the rotatable member against the housing to prevent unwanted rotation.

24 Claims, 9 Drawing Figures

APPARATUS FOR SUPPORTING AN AIRCRAFT GUIDE TRACK FOR A MOVABLE AIRFOIL

TECHNICAL FIELD

The present invention relates to an apparatus for supporting an aircraft wing leading edge guide track which slideably engages an aircraft wing leading edge assembly, and more particularly to an apparatus having an adjustable length along the longitudinal axis thereof to allow repositioning of the track relative to the aircraft wing.

BACKGROUND OF THE INVENTION

Common apparatuses for modifying the lift characteristics of an airfoil for low speed operation is the use of aircraft wing leading edge devices, often referred to as leading edge slats which either pivot or slide forwardly and downwardly from the leading edge of the aircraft wing to a deployed position. Often these leading edge slats are supported by a plurality of track assemblies, each of which is positioned chordwise (fore and aft) inside a wing cavity formed by the upper and lower surfaces of the aircraft wing. Each of the support tracks may engage an arm extending rearwardly from the slat which slides within the track during retraction and extension of the wing slat. These slat tracks may have a curved cross-sectional configuration to guide the slat forwardly and downwardly during deployxent. In order for the trailing edge of the slat in the retracted position to be properly aligned with the upper surface of the wing, it is important that the slat tracks be aligned spanwise along the wing. Any misalignment of these tracks may disrupt the flow of air over the surface of the wing.

In order to permit alignment of the slat tracks, conventionally the slat tracks have been connected to the wing by means which are adjustable to permit repositioning of the slat track relative to the wing. One device utilizes a threaded vertical shaft connected at opposite ends to the slat track and wing, respectively. An upper end of the shaft is threadably engaged to a threaded portion of the slat track and rigidly secured thereto by a threaded nut engaged against the slat track. The other lower end of the shaft is slideably disposed through an opening in the wing assembly wherein the shaft includes at the lower end thereof a radial member integrally attached thereto to prevent retraction of the shaft from the wing assembly opening. The shaft includes a second nut threadably attached thereto at the lower end to engage the wing assembly between the radial member and the second nut. Lockwires are used to prevent unwanted rotation of the first and second nut. In order to adjust the position of the slat track relative to the wing assembly, the lockwires are removed, both the upper and lower nuts are loosened, and the shaft is rotated relative to the slat track and wing assembly causing the slat track to move relative to the wing assembly depending upon the direction of rotation of the shaft. The upper and lower nuts are retightened and the lockwires are reengaged. It is difficult, however, to obtain a precise positioning of the slat track because tightening of the upper and lower nuts about the shaft causes some rotation of the shaft relative to the wing assembly and slat track. Therefore, in order to obtain the desired positioning, it is necessary to estimate the amount of rotation which will be imparted to the shaft due to retightening of the upper and lower nuts, and then to adjust the position of the shaft beforehand to compensate for this subsequent shaft rotation.

In commercial aircraft, the wing cavities where the slat track supports are located are filled with a maze of hydraulic lines, electrical cables and air ducts. Due to the quantity and size of these cables and lines, access into the wing cavity area is severely restricted. A common access port into the wing cavity area is through the lower surface of the wing which is typically covered by removable wing panels. In reference to the aforementioned slat track supports, access to the upper nut is particularly difficult due to the distance between the opening of the access port and the upper nut. This difficulty in accessing the upper nut location, combined with the problem of obtaining proper slat track positioning while tightening the upper and lower nuts, makes accurate alignment of the slat tracks difficult.

Other conventional variable length linkages which have been disclosed include U.S. Pat. No. 4,218,156—Logan, wherein there is disclosed a mechanical linkage comprising a threaded shaft having a first clevis integrally attached thereto at one end thereof, and a second clevis having an integral boss tapped for receipt of the other end of the threaded shaft therein. The boss includes an hexagonally shaped exterior surface for receiving a keeper therearound which is prevented from rotation by a nut threadably engaged to the shaft and tightened against the keeper.

In U.S. Pat. No. 2,704,682—Davis, there is disclosed an apparatus for securing rolling casters to hollow tubular members of furniture legs and the like, wherein upper and lower wedge members of the caster are caused to compress a wedge piece therebetween causing the wedge piece to expand radially against the inner surface of the tubular member.

In U.S. Pat. No. 4,092,080—Bradley, Jr., there is disclosed an adjustable length linear rod comprising an externally threaded male member engaged within an internally threaded female member. The male member is secured against rotation within the female member by an anti-rotation means comprising two semi-circular conical members having key portions which engage slots in the female member The semi-circular conical members are frictionally engaged by a conical member in cooperation therewith by means of a threaded nut tightened thereagainst.

In U.S. Pat. No. 2,999,706—Wilcox, there is disclosed an apparatus for locking a first tube within a second tube wherein axial rotation of a shaft engaging the first tube causes two opposing wedge members to compress a wedge piece therebetween thereby radially expanding the wedge piece against an inner surface of the second tube.

In U.S. Pat. No. 4,181,280—Bowman, there is disclosed a bell assembly for adjusting the height of a chair wherein the bell assembly is threaded onto a support post slideably located in a hub, and the bell assembly is rotated to regulate the height of the support post relative to the hub.

In U.S. Pat. No. 2,433,617—Marsilius, there is disclosed an apparatus for removably securing a guide pin to the bed of a die-set or the like, wherein the lower end of each pin includes a threaded shaft having disposed therein opposing inwardly tapered members. The inwardly tapered members define a recess for receiving flexible members therein which are compressed and expanded outwardly against the bed of the die-set when the shaft is rotated and the opposing tapered portions move toward each other.

In U.S. Pat. No. 4,068,858—Harrison, et al, there is disclosed a bicycle handlebar stem comprising an outer hollow tubular member which receives therein an inner tubular stem. The hollow tubular stem includes a shaft therethrough for engaging at the lower end of the tubular stem a wedge member in a tapered base portion of the tubular stem. Rotation of the shaft causes the wedge member to become lodged in the tapered bore portion.

In U.S. Pat. No. 2,947,556—Wenger, there is disclosed a vertically adjustable device for supporting a music rack comprising an inner tubular member longitudinally disposed within a hollow outer tubular member. A frustrum-shaped plug is spring biased against the inner surface of a tapered skirt depending downwardly from the inner tube to urge the skirt against the inner surface of the outer tube in frictional engagement therewith.

In U.S. Pat. No. 2,878,042—Trimble, there is disclosed a golf cart having upper retaining members which are adjustable to fit around a golf bag and which secure the golf bag to the cart. The clamping members are secured together in an adjustable relationship by an adjustable wedge member which when moved in an upward direction against a wedge-shaped guide causes radial displacement of the wedge members forcing the retaining members together.

In U.S. Pat. No. 2,584,614—Rasmussen, there is disclosed a clamping means for a square-shaped tool bar comprising a V-shaped member for receiving a first set of opposing adjacent surfaces of the tool bar therein, and opposing wedge members having opposing inclined surfaces which engage a second set of opposing adjacent surfaces of the tool bar. Movement of the wedge members toward each other causes displacement of the tool bar against the V-shaped member in engagement therewith.

In U.S. Pat. No. 3,175,455—Reddy, there is disclosed a self-locking expansion bolt for engaging a plate to a base member, comprising a threaded bolt disposed within a frustoconical wedge member which in combination with an inner surface of the base member defines a recess for receiving frustoconically shaped wedge pieces therein. Placement of the self-locking expansion bolt within an opening in the base member, and rotation of the bolt causes movement of the wedge members against the wedge pieces displacing the wedge pieces radially against the inner surface of the base member In U.S. Pat. No. 3,501,183—Stratienko, there is disclosed a self-innerlocking wedge device comprising an outer thrust collar having an axially tapered inner surface for receiving a shaft or the like therethrough. A recess, defined by the tapered inner surface of the thrust collar and the outer surface of the shaft, receives a wedge member therein. Due to the difference in coefficients of friction between the inclined surface and straight surface of the wedge members, axial movement of the shaft causes deflection of the wedge surface against the thrust collar securing the shaft to the collar.

SUMMARY OF THE INVENTION

The present invention comprises apparatus for attaching a support assembly for a movable airfoil member to a wing. Typically the movable airfoil member comprises a slat deployable from the leading edge of the wing, or a flap member deployable from a trailing edge of the wing. In an exemplary embodiment, the movable airfoil member is a leading edge slat deployable from a leading edge of an aircraft wing. The apparatus comprises means for supporting the movable airfoil member for movement between an extended position and a retracted position. In an exemplary embodiment the support assembly is a track arm slideably engaged to the wing for chordwise movement relative to the wing. The apparatus includes positioning means having a first end and a second end wherein the first end is connected to the support assembly. The attaching means also includes locating means rotatably engaged to the positioning means and movable along an adjustment axis in a first direction, and a second direction opposite to the first direction, so as to reposition the locating means along the adjustment axis. In an exemplary embodiment, the adjustment axis is generally perpendicular to a lower surface of the wing.

The apparatus also includes base means having (i) a first portion adapted to engage the locating means to restrict movement of the positioning means in the first direction, and (ii) a second portion operatively connected to the wing. The second portion includes an engaging member movable along the adjustment axis between a first position spaced away from the locating means and a second position in engagement with the locating means in a friction-tight fit therewith to restrict rotation of the locating means, and to restrict movement of the positioning means in the second direction. The repositioning of the locating means along the adjustment axis causes the supporting means to be repositioned in a direction along the adjustment axis.

The base means includes clamping means adapted to move into engagement with the engaging member to cause the engaging member to move along the adjustment axis between the first position and the second position. The engaging member includes opposing angled surfaces. The clamping means includes first and second wedge members operatively connected to the wing and having complementary angled surfaces adapted to (i) engage the opposing angled surfaces of the engaging member, and (ii) to support the engaging member to restrict movement of the positioning means in the second direction. The clamping means also includes tightening means to cause the first and second wedge members to move along a tightening axis and to engage the engaging member. Other means for causing movement of the engaging means between the first and second positions along the adjustment axis are contemplated in the invention of the present application. The use of clamping means described herein is an exemplary embodiment for causing movement of the engaging means between the first and second position.

The support assembly is pivotally connected to the wing at a first pivot point and pivotally connected to the positioning means at the first end of the positioning means so that movement of the positioning means along the adjustment axis causes the support assembly to pivot about the first pivot point. The pivoting of the support assembly about the first pivot point, which is located forward of the positioning means, allows the slat to be positioned relative to the wing to correctly align the slat with the upper surface of the wing.

The first portion of the base means includes a first surface, a second surface and an opening therethrough along the adjustment axis. In addition, the locating means includes a first portion adapted for rotatable movement within the opening, and an outwardly projecting second portion adapted to engage the first surface of the base means to restrict movement of the positioning means in the first direction. The second portion of the locating means is engaged between the first surface of the base means and the engaging means in a friction-tight fit when the engaging means is in the second position. By restricting rotation of the locating means the position of the locating means relative to the positioning means is maintained thereby maintaining the desired position of the slat relative to the wing.

The second portion of the base means includes a passageway therethrough adapted to receive the first and second wedge members therein for movement along the tightening axis. The engaging means are operatively connected to the first and second wedge members. The tightening means include a shaft member adapted (i) to engage the engaging member to permit movement of the engaging member along the adjustment axis between the first position and the second position, and (ii) to engage the first and second wedge members to permit movement of the wedge members along the tightening axis in a direction substantially perpendicular to the adjustment axis.

The present invention also comprises a method for adjusting the position of an aircraft airfoil relative to an aircraft wing. The method comprises the steps of moving first and second wedge members, having complementary formed angled surfaces adapted to engage first and second opposing side portions of an engaging member operatively connected to the wing along a tightening axis. The first and second wedge members are moved away from the first and second side portions to cause the engaging member to move relative to the first and second wedge portions, respectively, along an adjustment axis substantially perpendicular to the tightening axis, to a first position wherein the engaging member is disposed away from a locating member. The method also includes the step of rotating the locating member about a positioning member, which has a first end connected to the guide track, for movement along the positioning member, to cause the locating member to move along the adjustment axis. The locating member is movable in a first direction, and a second direction opposite to the first direction, along the adjustment axis so as to reposition the locating member along the adjustment axis. The method also comprises moving the first and second wedge members toward the engaging member along the tightening axis to cause the engaging member to move relative to the first and second wedge portions, respectively, along the adjustment axis, to a second position wherein the locating member is engaged between (i) base means, operatively connected to the wing, to restrict movement of the positioning member in the first direction, and (ii) the engaging member, in a friction-tight fit, to restrict rotation of the engaging member and to restrict movement of the positioning member in the second direction.

It is therefore an object of the present invention to provide a support, for a leading edge device track, which is adjustable to permit repositioning of the track.

A broader object of the present invention is to provide a support, for a structural member, which is adjustable to permit repositioning of the structural member.

BRIEF DESCRIPTION OF THE DRAWINGS

These and other objects and advantages of the present invention will become more readily apparent upon reading the following detailed description and upon reference to the attached drawings in which.

While the present invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents and alternatives falling within the spirit and scope of the invention.

DETAILED DESCRIPTION OF THE INVENTION

The present invention will be described in an exemplary embodiment as an apparatus for supporting a movable airfoil guide track. It should be appreciated, however, that the present invention is not limited to supporting an airfoil guide track, but is applicable for supporting other devices when it is desirable that these devices have the capability of being repositioned in a manner described further herein.

Figures 1, 2, 3:
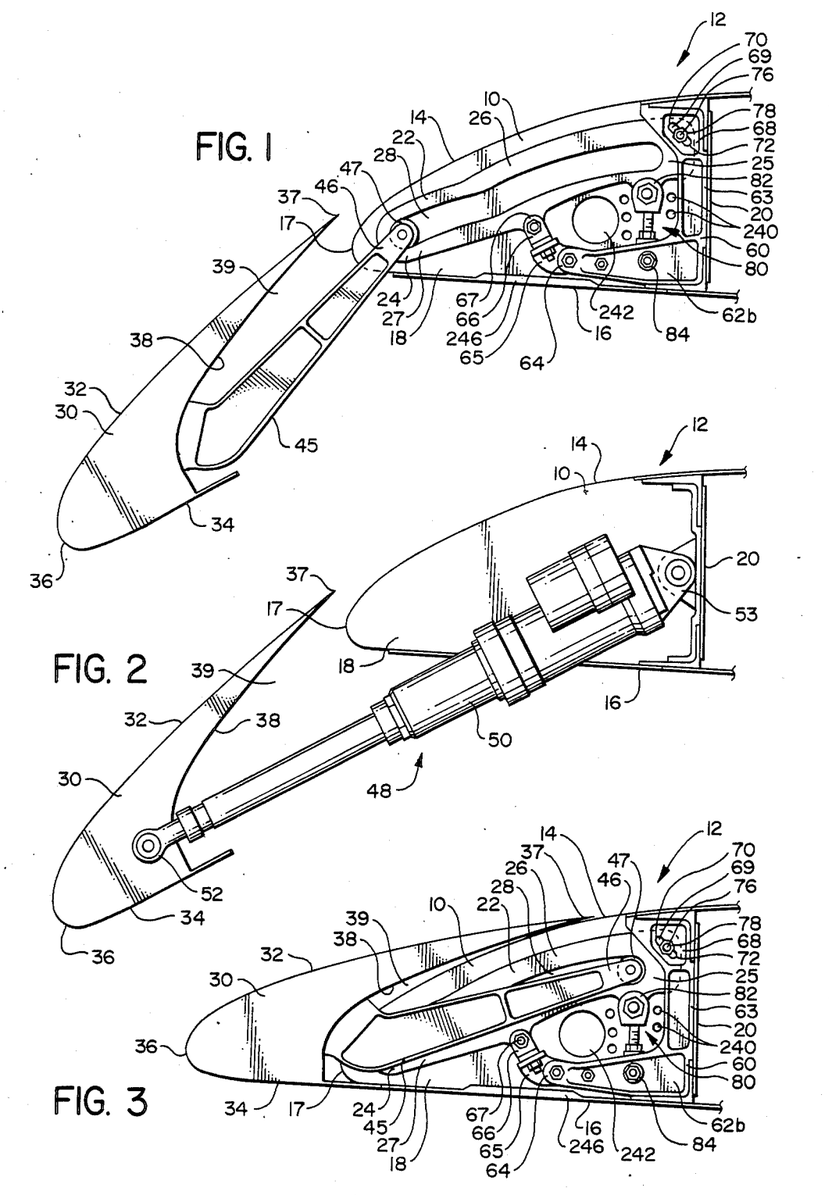
FIG. 1 is a cross-sectional side view of an extended leading edge slat engaged by a track supported by a forward pivot connector and a rearward longitudinally adjustable track support.
FIG. 2 is a cross-sectional side view, taken at a different spanwise location than the view in FIG. 1, of the extended leading edge slat engaged by an actuating arm for moving the leading edge slat between the "extended" position and a "retracted" position shown in FIG. 3.
FIG. 3 is a cross-sectional side view of the leading edge slat, taken at the same location as the view of FIG. 1, in the "retracted" position showing the leading edge slat engaged by the track which is supported by a forward pivot connector and a rearward longitudinally adjustable track support.

Referring to FIGS. 1, 2 and 3, there is shown a leading edge portion 10 of an aircraft wing indicated at 12 including a wing upper surface 14 and a wing lower surface 16 which terminate together at a leading edge 17. A wing cavity area 18 is defined by wing upper surface 14, wing lower surface 16 and at the rear end by a front spar 20 extending along the length of the wing and extending vertically between the wing upper surface 14 and wing lower surface 16, respectively. Located inside wing cavity 18 is an elongated track member 22 disposed in a chordwise direction therein and including a forward portion 24 located forwardly of and downwardly from a rear portion 25; forward portion 24 and rear portion 25 comprise opposing U-shaped members which are connected by an upper rail 26 and a lower rail 27 to define a channel 28. Connected to track member 22 is a leading edge slat 30 having an upper surface 32 and a lower surface 34 which terminate together at a leading edge 36, with the upper surface terminating at a trailing edge 37. Slat 30 includes a concave-like rear surface 38 which defines a recessed area 39 for receipt of leading edge portion 17 therein when slat 30 is in a "retracted" position as illustrated in FIG. 3.

Figure 4:
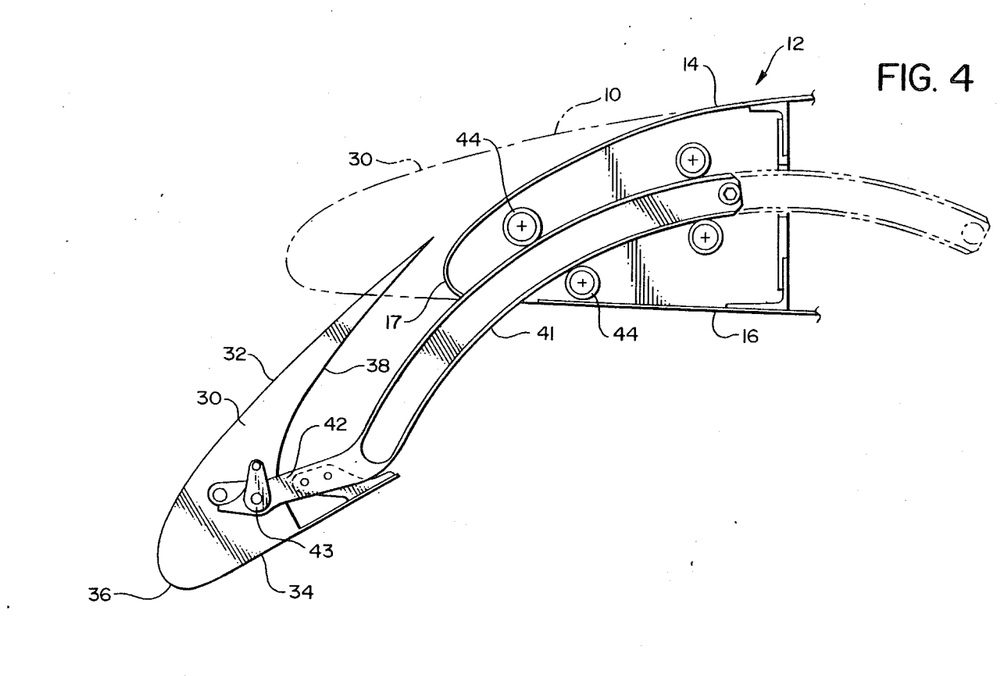
FIG. 4 is a cross-sectional side view, taken at a different spanwise location than the views in FIGS. 1 and 2, of the extended leading edge slat engaged by a main track.

Slat 30 is mounted to two additional main track assemblies 40 located spanwise from track 22, one of which is shown in FIG. 4, in order to support slat 30 between the "retracted" and "deployed" positions and to hold slat 30 in the desired aerodynamic configuration. Main track assembly 40 includes a curved track 41 having a first end 42 connected to slat 30 at a pivot connector 43. Track 41 is supported by rollers 44 rotatably engaged to wing 12 within cavity area 18 to permit slideable movement of track 41 to guide and support slat 30 between the "extended" and "retracted" positions.

In order to support slat 30, there is shown in FIGS. 1 through 3, a slat support arm 45 extending rearwardly from slat rear surface 38, which includes at a distal end 46 thereof, a rotating member 47 engaged within slotted portion 28 of track 22 for rotatable slideable movement therewithin. Fore and aft movement of rotating member 47 within slotted portion 28 allows movement of slat 30 between an "extended" position wherein slat 30 is disposed forwardly and downwardly from leading edge portion 10 as shown in FIG. 1, and a "retracted" position wherein slat upper surface 32 and slat lower surface 34 are aligned with wing upper surface 14 and wing lower surface 16, respectively, and wing leading edge 17 is disposed within slat recess 39 as shown in FIG. 3.

Movement of slat 30 between the "extended" and "retracted" positions is effected, as shown in FIG. 2, by an hydraulic actuating piston-cylinder assembly indicated at 48 including a piston 49 engaged within an actuating cylinder 50 wherein an end 52 of piston 49 is pivotally connected to slat 30, and an end 53 of cylinder 50 is pivotally connected to spar 20. Piston 49 is extended in a conventional manner from cylinder 50 to move slat 30 into the "extended" position, whereas retraction of piston 49 into cylinder 50 causes movement of slat 30 into the "retracted" position.

In order to support slat track 22 from wing 10, there is provided a wing bracket means 60 mounted to and forward of spar 20. Bracket means 60 includes parallel lower arms 62a, 62b (FIG. 5) projecting forwardly from a vertical support member 63 and terminating at forward ends 64, which engage an end member 65 (FIG. 1) therebetween. Attached to end member 65 is a pivot connector 66, having a pivot axis 67 oriented spanwise along wing 12, which pivotally engages slat track 22 approximately midway between forward portion 24 and rear portion 25 to allow repositioning of slat track 22 about pivot connector 66.

Bracket means 60 includes a first flange member 68 projecting forwardly from vertical member 63 at an upper location thereof, and a second flange member (not shown) projecting forwardly from vertical member 63 parallel to flange member 68 for engaging an upper portion 69 of track 22 between first flange member 68 and the second flange member. Flange member 68 includes an elongated slot 70 having a forward end 71 and a rear end 72 wherein forward end 71 is located above and forward of rear end 72. Slot 70 is disposed to receive an elongated member 76 therethrough; elongated member 76 projecting spanwise from, and rigidly connected to, slat track upper portion 69. Slot 70 is adapted to receive elongated member 76 in slideable engagement therewithin to permit movement of elongated member 76 between forward end 71 and rear end 72 when slat track 22 is repositioned about pivot connector 66. Elongated member 76 includes a lock cap 78 which retains elongated member 76 within slot 69 and permits slideable movement of member 76 therewithin.

In order to regulate the position of slat track 22 and to support slat track 22 at rear portion 25, there is provided an adjustable slat track support assembly indicated at 80. Support assembly 80 includes an upper end 82 connected to lower rail 27 of slat track 22 at rear portion 25 thereof, and a lower portion 84 connected to arms 62a, 62b of wing bracket 60. Support assembly 80 is adjustable along an adjustment axis generally perpendicular to a chordwise axis of wing 12 in a manner to be further described, in order to permit realignment of slat track 22 about pivot connector 66. Support assembly 80 supports slat track 22 against load forces acting both upwardly and downwardly upon slat 30. However, when slat 30 is in the "retracted" position with no aerodynamic loads acting upon slat 30, slat 30 at trailing edge 37 is supported on upper surface 14 of wing 12 so that the primary forces acting through support assembly 80 are in an upward direction.

Figure 5:
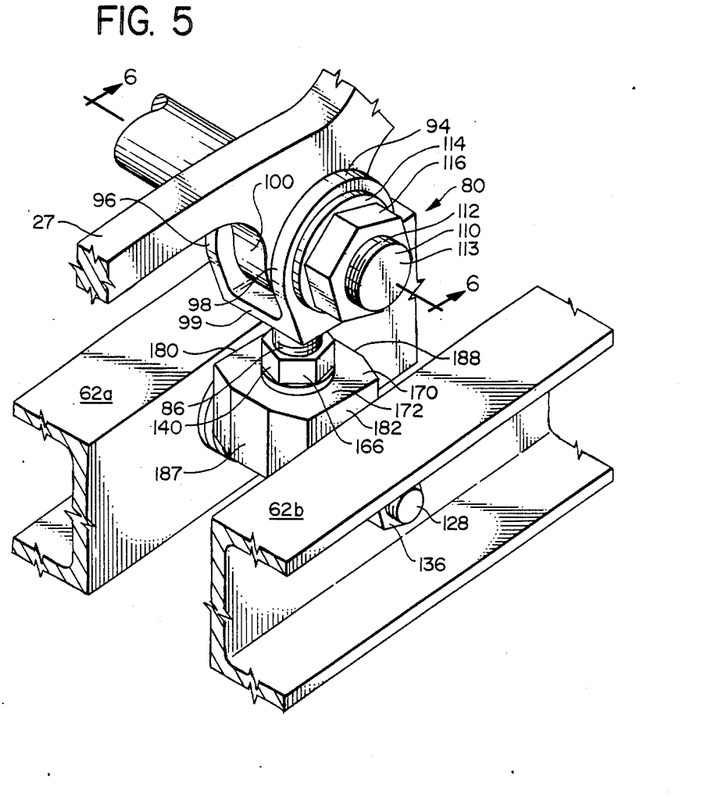
FIG. 5 is an isometric view of the longitudinally adjustable track support.
Figure 6:
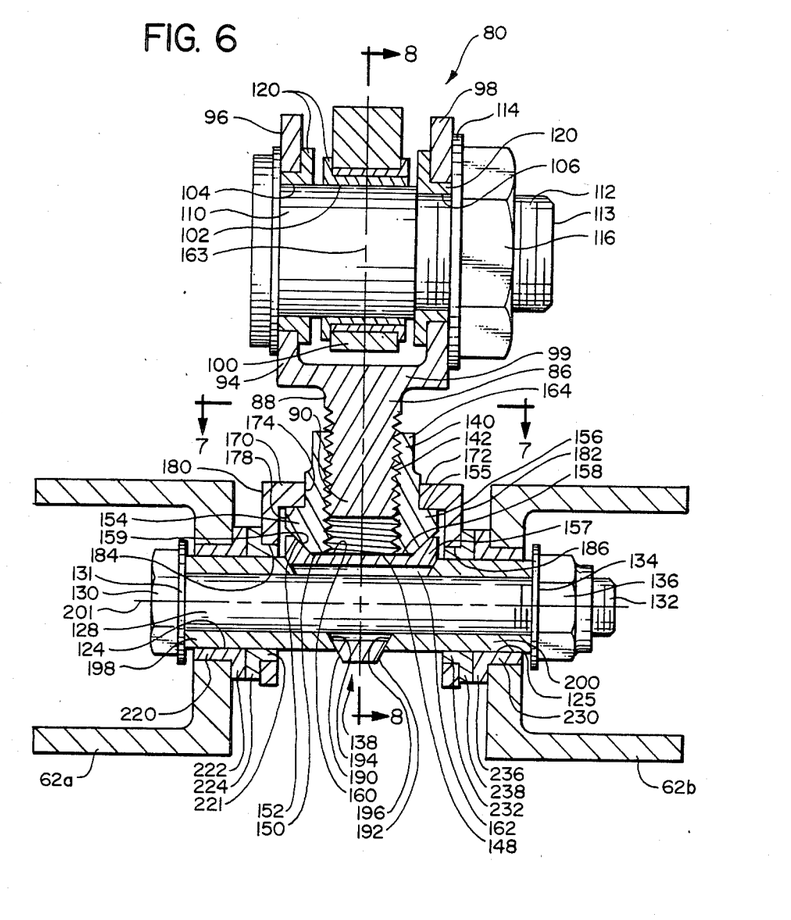
FIG. 6 is a cross-sectional side view of the longitudinally adjustable track support taken along lines 6—6 of FIG. 5.

In order to describe slat track support assembly 80 in further detail, reference is made to FIGS. 5 and 6, wherein there is shown support assembly 80 included in an elongated shaft 86 having an upper end 88 and a lower end 90. Integrally connected to shaft 86 at upper end 88 is a clevis 94 having opposing sidearms 96, 98 and a bottom portion 99 integrally connected with sidearms 96, 98 at a lower end thereof to form a channel for receiving a mounting shoulder 100 projecting downwardly from lower rail 27 of slat track 22 in pivotal engagement therewith. Mounting shoulder 100 includes an opening 102 therethrough which is axially aligned with openings 104, 106 at clevis sidearms 96, 98, respectively, for receiving a threaded shaft 110 therethrough for pivotally connecting track shoulder 100 to clevis 94. Mounting shaft 110 includes a threaded portion 112 at an end 113 thereof to receive a lock washer 114 and a threaded nut 116 thereon. Bushings 120 are disposed along shaft 110 within openings 102, 104, 106 to promote pivotal movement of track 22 about mounting shaft 110.

Support for slat track support assembly 80 is provided by support bracket lower arms 62a, 62b which include opposing openings 124, 125, respectively, through the side thereof for receiving a horizontally disposed support shaft 128 therethrough. Support shaft 128 includes an hexagonally shaped head 130 and washer 131, and a threaded end portion 132 for receiving a washer 134 and a threaded nut 136 thereon. Disposed between head washer 131 and end washer 134 is a locking assembly, generally indicated at 138, for preventing unwanted rotation of a locating nut 140 rotatably engaged to shaft 86.

Locating nut 140 has internal threads 142 for rotational axial movement on shaft 86. Locating nut 140 also includes a lower surface portion 148 having a flat surface 150 disposed perpendicular to vertical shaft 86, and flared circumferential side surfaces 152 extending upwardly and outwardly therefrom to form a shoulder portion 154 circumferentially therearound and including an upper surface 155 disposed perpendicular to shaft 86; surfaces 150, 152 forming a frusto-conical head 156. Oppositely disposed in mating engagement with flat surface 150 and flared side surfaces 152 is a support wedge 157 having complementary flat surface 158 and complementary circumferential flared surfaces 159 to form a concave seat 160 for engaging flat surface 150 and flared surfaces 152, respectively, to support track 22 via vertical shaft 86 and nut 140 thereon. Wedge 157 includes a passageway 162, disposed perpendicular to support shaft 86, for receiving horizontal support shaft 128 therethrough; support shaft 128 connected to wing bracket arms 62a, 62b in a manner to be further described to provide support for wedge 157. Wedge 157 in combination with support shaft 128 and support sleeves to be described later, restricts downward movement of slat track support assembly 80 when slat 30 is subjected to downward aerodynamic forces. The diameter of passageway 162 is greater than the diameter of shaft 128 to permit downward vertical movement of wedge 157 relative to support shaft 128 when slat track support assembly 80 is being adjusted to reposition slat track 22.

Figure 7:
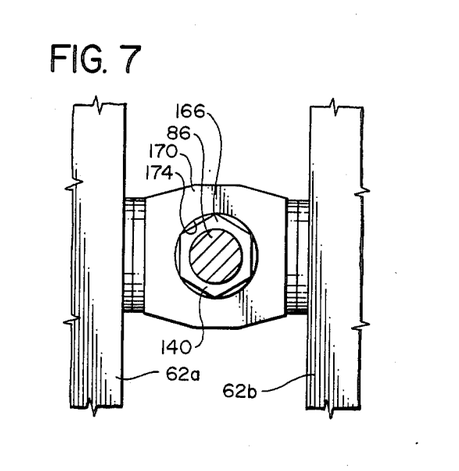
FIG. 7 is a top cross-sectional view taken along lines 7—7 of FIG. 6 showing a housing of the longitudinal adjustable support connected to a portion of an aircraft wing assembly.

Clockwise rotation of locating nut 140, as viewed from the top in FIG. 7, displaces nut 140 along vertical shaft 86 towards lower end 90 thereof effectively increasing the vertical distance between shoulder portion 154 and mounting shaft 110 along an adjustment axis 163 coincident with the longitudinal axis of vertical shaft 86. Increasing the vertical distance between shoulder 154 and clevis 94 causes displacement of clevis 94 and rear portion 25 of track 22 in an upward direction along adjustment axis 163 such that track 22 pivots about pivot connector 66 (FIG. 1). On the other hand, counterclockwise rotation of nut 140 moves nut 140 along shaft 86 toward upper end 88 decreasing the vertical distance between shoulder portion 154 and mounting shaft 110 causing displacement of rear portion 25 of track 22 in a downward direction. Support nut 140 includes a neck portion 164 extending upwardly therefrom and terminating in a chamfered member 166 for receiving an instrument therearound to impart a rotational force to move nut 140 along shaft 86.

In order to engage surface 155 of shoulder portion 154 and to restrict upward movement of slat track support assembly 80 when slat 30 is subjected to upward aerodynamic forces, there is provided a trunnion housing 170 including an upper portion 172 having a vertical opening 174 for receiving neck portion 164 therethrough in axial slideable engagement therewith. Upper portion 172 includes a lower surface 178 for engaging wedge surface 155 thereagainst. Extending downwardly from upper portion 172 of housing 170 are opposing sidewalls 180, 182 having openings 184, 186, respectively, for receiving support shaft 128 therethrough. Integrally joined with opposing sidewalls 180, 182 are opposing sidewalls 187, 188 (FIG. 5) extending downwardly from upper portion 172.

Figure 8:
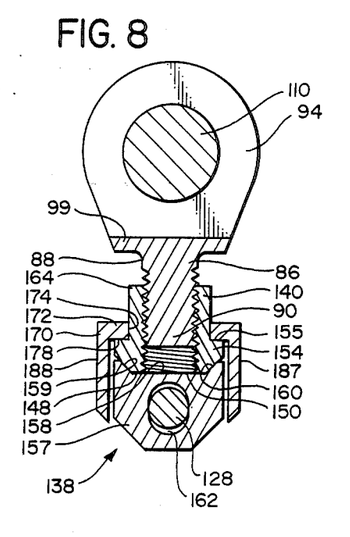
FIG. 8 is a front cross-sectional view of the adjustable support taken along lines 8—8 of FIG. 6 showing the adjustable support in a "locked" configuration.

In an exemplary embodiment of the present invention shown in FIGS. 5 and 6, to prevent unwanted rotation of locating nut 140 after slat track 22 has been realigned to the desired position, wedge 157 includes opposing sidewalls 190, 192 which are preferably flat, and which are sloped downwardly and inwardly from flared surfaces 159 to terminate in a bottom portion 194. Directly opposite sidewalls 190, 192 are complementary formed end walls 194, 196, respectively, of locking tubular members 198, 200, respectively, which are disposed about shaft 128 on either side of wedge 157, inboard of lock washers 131, 134, respectively, within openings 124, 125 of housing sidewalls 180, 182. Therefore, rotation of horizontal shaft 128 relative to end nut 136 by applying a torsional force to head 130 thereof, causes inward axial movement of locking tubes 198, 200 along a tightening axis 201 substantially perpendicular to adjustment axis 163 to engage locking tube surfaces 194, 196 against wedge member surfaces 190, 192, respectively, causing wedge 157 to move in an upward direction along adjustment axis 163 and along locking member surfaces 194, 196. This in turn causes wedge surfaces 158, 159 to engage support nut surfaces 150, 152 and causes support nut shoulder surface 155 to engage housing surfaces 178 in a friction tight fit therewith as illustrated in FIG. 8.

Figure 9:
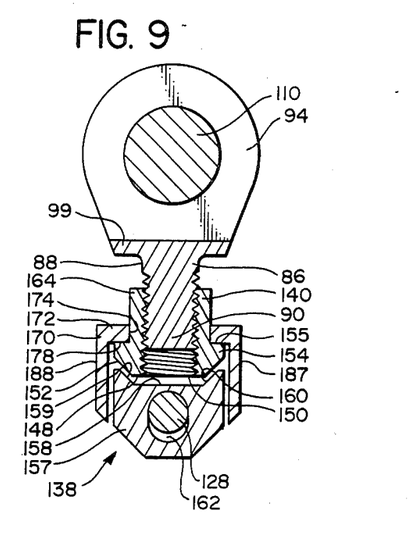
FIG. 9 is a front cross-sectional view of the adjustable support showing the adjustable support in an "unlocked" configuration.

Rotation of horizontal support shaft 128 (FIG. 6) in the opposite direction relieves the inward wedging force applied by locking tubes 198, 200 thereby allowing wedge seat 160 to drop away from head 156 of locating nut 140 diametrically across passageway 162 to a spaced away "disengaged" position as illustrated in FIG. 9. As discussed previously, in a "no aerodynamic load" configuration, slat 30 is supported on wing upper surface 14 (FIG. 1) at slat trailing edge 37 when slat 30 is in the "retracted" position. Therefore, there is almost no downward movement of shaft 86 and support nut 140 when the inward pressure applied by locking tubes 198, 200 is relieved. Disposed about locking tubes 198 (FIG. 5) within bracket, trunnion openings 124, 184 are bushings 220, 221, including spacer members 222, 224, respectively, disposed between lower arm 62a and housing sidewall 180. Bushings 230, 232 are disposed about locking tube 200 within openings 125, 186, respectively, and include spacer members 236, 238, respectively, disposed between housing sidewall 182 and lower arm 64b.

When slat 30 is subjected to aerodynamic loads, upwardly acting aerodynamic forces are transmitted via locating nut 140 at upper surface 155 thereof and trunnion housing 170 to locking tubular members 198, 200 in a direction substantially perpendicular to tightening axis 201 of locking tubular members 198, 200. Likewise downwardly acting aerodynamic forces are transmitted via locating nut 140 at frusto-conical head 156 and wedge member 157 to locking tubular members 198, 200 at end surfaces 194, 196, respectively, in a direction substantially parallel to tightening axis 201. Therefore, locking tubular members 198, 200 act in combination with shaft 128 to support guide track 22 when slat 30 is subjected to upward and downward aerodynamic forces.

Referring to FIG. 1, slat track support assembly 80 is shown disposed amongst electrical and hydraulic lines 240 and air duct 242 which run spanwise through cavity 18 of wing 12. The location of electric/hydraulic lines 240 illustrate the difficulty of accessing support assembly 80. Typically in commercial aircraft, access is provided through lower wing surface 16 which includes removable access panels 246 covering an opening (not shown) through wing lower surface 16 to allow insertion of a tool to adjust support member 80 in order to realign slat track 22 as discussed previously. Conventional slat track support assemblies required accessing adjustable members at opposite ends of a support assembly located a significant upward distance within wing cavity 18. In the present invention however, in order to adjust wing support assembly 80, it is necessary to engage and rotate bolt head 130 (FIG. 6) to allow wedge member 157 to move in a downward direction away from support nut 140. Upon releasing wedge member 157, chamfered member 166 of locating nut 140 is engaged and rotated in the desired direction by a tool having an L-shaped end portion to rotate nut 140 along adjustment axis 163 in order to reposition slat track 22. Upon repositioning slat track 22 to the desired position, bolt head 130 is retightened causing wedge member 157 to move upward along adjustment axis 163 to engage locating nut 140 against housing surface 178 to prevent unwanted rotation of support nut 140. It should be appreciated that the present invention allows for realignment of slat track 22 by rotation of shaft chamfered member 166 and locating nut 140, which are disposed in relative proximity to the wing lower surface access opening. The present invention eliminates the need for a lock wire to engage nut 140 because of the wedging effect of wedge 157 and trunnion housing 170. In addition, axial movement of wedge member 157 engages locating nut 140 without imparting a rotational force to nut 140 so that the desired alignment of slat 30 is maintained.

What is claimed is:

1. Apparatus for attaching a support assembly for a movable airfoil member to a wing, said apparatus comprising:
   a. positioning means having a first end and a second end, said first end connected to said support assembly;
   b. locating means rotatably engaged to said positioning means and movable along an adjustment axis in a first direction, and a second direction opposite to said first direction, so as to reposition said locating means along said adjustment axis, said repositioning of said locating means causing said support assembly to be repositioned in a direction along said adjustment axis; and
   c. base means including (i) a first portion adapted to engage said locating means to restrict movement of said positioning means in said first direction, (ii) a second portion operatively connected to said wing, and (iii) engaging means movable along said adjustment axis between a first position spaced away from said locating means and a second position in engagement with said locating means to restrict rotation of said locating means and to restrict movement of said positioning means in said second direction.

2. The apparatus as set forth in claim 1 wherein said base means includes clamping means adapted to move into engagement with said engaging means to cause said engaging means to move along said adjustment axis between said first position and said second position.

3. The apparatus as set forth in claim 2 wherein:
   a. said engaging means includes opposing angled surfaces; and
   b. said clamping means comprises:
      1. first and second wedge members operatively connected to said wing and having complementary angled surfaces adapted to (i) engage said opposing angled surfaces of said engaging means, and (ii) to support said engaging means to restrict movement of said positioning means in said second direction, and
      2. tightening means to cause said first and second wedge members to move along a tightening axis and engage said engaging means.

4. The apparatus as set forth in claim 3 wherein said positioning means comprises an elongated member having a longitudinal axis coincident with said adjustment axis.

5. The apparatus as set forth in claim 4 wherein said support assembly (i) is pivotally connected to said wing at a first pivot point, and (ii) pivotally connected to said positioning means at said first end thereof, so that movement of said positioning means along said adjustment axis causes said support assembly to pivot about said first pivot point.

6. The apparatus as set forth in claim 3 wherein:
   a. said base means first portion includes a first surface, a second surface and an opening therethrough along said adjustment axis; and
   b. said locating means includes a first portion adapted for rotatable movement within said opening, and an outwardly projecting second portion adapted to engage said base means first surface to restrict movement of said positioning means in said first direction.

7. The apparatus as set forth in claim 6 wherein said locating means second portion is engaged between said base means and said engaging means in a friction-tight fit when said engaging means is in said second position.

8. The apparatus as set forth in claim 7 wherein:
   a. said airfoil member comprises a leading edge slat; and
   b. said support assembly comprises a slat track.

9. The apparatus as set forth in claim 7 wherein:
   a. said base means second portion includes a passageway therethrough adapted to receive said first and second wedge members therein for movement along said tightening axis; and
   b. said engaging means is operatively connected to said first and second wedge members.

10. The apparatus as set forth in claim 9 wherein said tightening means includes a shaft member adapted (i) to engage said engaging means to permit movement of said engaging means along said adjustment axis between said first position and said second position, and (ii) to engage said first and second wedge members to permit movement of said wedge members along said tightening axis in a direction substantially perpendicular to said adjustment axis.

11. Apparatus for supporting an aircraft airfoil device from an aircraft wing having a wing edge, said apparatus comprising:
    a. a member for supporting said airfoil device between an extended position and a retracted position, said supporting member pivotally connected to said aircraft wing at a first attachment point on said supporting member;
    b. means for attaching said supporting member to said aircraft wing edge at a second attachment point of said supporting member to allow pivotal movement of said supporting member about said first attachment point, said attaching means including:
       1. a positioning member having a first end and a second end, said first end connected to said supporting member at said second attachment point,
       2. a locating member rotatably engaged to said positioning member for axial movement relative thereto along an adjustment axis in a first direction, and in a second direction opposite to said first direction in order to reposition said locating member along said adjustment axis thereby repositioning said supporting member in a direction along said adjustment axis, said locating member including an outwardly projecting shoulder portion, said shoulder portion having an upper surface and a lower surface, 3. a base member connected to said wing and having an upper portion which has an upper surface and a lower surface, said upper portion including an opening therethrough along said adjustment axis and in communication with said upper and lower surfaces for receiving said locating member therethrough for axial movement therewithin along said adjustment axis, said shoulder portion disposed beneath said upper portion lower surface, 4. means for moving an engaging member having an upper surface and a lower surface between a first position wherein said engaging member upper surface is disposed away from said shoulder portion lower surface, and a second position wherein said engaging member upper surface is disposed against said shoulder portion lower surface and said shoulder portion upper surface is disposed against said base member upper portion lower surface.

12. The apparatus as recited in claim 11 wherein:
a. said engaging member has first and second angled opposing side portions extending downwardly and inwardly from said upper surface;
b. said engaging member moving means includes:
 1. first and second wedge members having complementary formed angled surfaces adapted to engage said first and second angled side portions, respectively, and
 2. means for moving said first and second wedge members along a tightening axis substantially perpendicular to said adjustment axis and against said first and second side portion angled surfaces, respectively, to cause said first and second engaging member side portions, respectively, to move relative to said first and second wedge portions, respectively, to reposition said engaging member between said first position and said second position.

13. The apparatus as recited in claim 12 wherein:
a. said base member includes side portions extending downwardly from said upper portion, said upper portion and said side portions having respective inner surfaces which define a recessed area, said shoulder portion located within said recessed area; and
b. said wedge member moving means comprises a shaft member extending through said base member side portions, said first wedge member, said engaging member and said second wedge member, respectively, said shaft member including tightening means disposed at opposite ends thereof for engaging said first and second wedge member respectively to cause movement of said first and second wedge members toward each other along said tightening axis.

14. The apparatus as recited in claim 13 wherein said aircraft wing edge includes first and second support members each having an opening therethrough for receiving said first and second wedge members, respectively, therein for axial slideable movement.

15. The apparatus as recited in claim 14 wherein said locating member includes means for receiving a rotational force to cause axial movement of said locating member along said adjustment axis.

16. In an aircraft wing having an upper surface and a lower surface to define a wing cavity therebetween and an opening in said lower surface to provide access to said wing cavity, said wing cavity having an upper portion and a lower portion, an apparatus for supporting a movable airfoil member from said wing comprising:
a. means for supporting said movable airfoil member for movement between an extended position and a retracted position, said supporting means including a rear portion located in said upper portion of said wing cavity;
b. means for attaching said supporting means to said wing, said attaching means including:
 1. positioning means having a first end and a second end, said first end connected to said supporting means at said rear portion, said second end located in said lower portion of said wing cavity,
 2. locating means rotatably engaged to said positioning means at said second end and movable along an adjustment axis in a first direction and a second direction opposite to said first direction, said locating means adapted to be manually engaged through said wing access opening to cause rotation of said locating means along said positioning means so as to reposition said locating means along said adjustment axis, said repositioning of said locating means causing said supporting means to be repositioned along said adjustment axis,
 3. base means located in said wing lower portion and including (i) a first portion adapted to engage said locating means to restrict movement of said positioning means in said first direction, and (ii) a second portion operatively connected to said wing, said second portion including engaging means movable along said adjustment axis between a first position spaced away from said locating means and a second position in engagement with said locating means to prevent rotation of said locating means and to restrict movement of said positioning means in said second direction,
 4. clamping means adapted to engage said engaging means; and
c. means, adapted to be manually engaged through said wing access opening, for moving said clamping means into engagement with said engaging means to cause said engaging means to move along said adjustment axis between said first position and said second position.

17. A method for adjusting the position of an aircraft airfoil relative to an aircraft wing, the method comprising the steps of:
a. moving first and second wedge members, operatively connected to the wing and having complementary formed angled surfaces adapted to engage first and second opposing side portions of an engaging member, along a tightening axis, away from the first and second side portions to cause the engaging member to move relative to the first and second wedge portions, respectively, along an adjustment axis substantially perpendicular to the tightening axis, to a first position wherein the engaging member is disposed away from a locating member;

b. rotating the locating member about a positioning member, which has a first end connected to the aircraft airfoil, for movement along the positioning member, to cause the locating member to move along the adjustment axis, wherein the locating member is movable in a first direction and a second direction opposite to the first direction, so as to reposition the locating member along the adjustment axis; and c. moving the first and second wedge members toward the engaging member along the tightening axis to cause the engaging member to move relative to the first and second wedge portions, respectively, along the adjustment axis, to a second position wherein the locating member is engaged between (i) base means, operatively connected to the wing, to restrict movement of the positioning member in the first direction, and (ii) the engaging member, in a friction-tight fit to restrict rotation thereof and to restrict movement of the positioning member in the second direction.

18. Apparatus for attaching a support assembly for a movable airfoil member to a wing, said apparatus comprising:
a. positioning means having a first end which is connected to said support assembly and a second end;
b. locating means which are movably engaged to said positioning means and which are movable along an adjustment axis to a location where said locating means are at a first selected distance from said first end of said positioning means; and
c. base means including (i) connecting means which are operatively connected to said wing, (ii) retaining means which engage said locating means so as to position said support assembly at a first selected location relative to said wing, and (iii) engaging means which are movable between a first position where said engaging means are disengaged from said locating means and a second position where said engaging means are in engagement with said locating means to restrict said movement of said locating means along said adjustment axis so as to maintain said first selected distance between said positioning means first end and said locating means and to maintain said support assembly at said first selected location.

19. The apparatus as set forth in claim 18 wherein:
a. said locating means are rotatably engaged to said positioning means for movement in a first direction, and in a second direction which is opposite to said first direction; and
b. said engaging means are moved to said second position in engagement with said locating means to restrict said rotation of said locating means along said adjustment axis so as to maintain said first selected distance between said positioning means first end and said locating means.

20. The apparatus as set forth in claim 19 wherein said base means includes clamping means which engage said engaging means to cause said engaging means to move along said adjustment axis between said first position and said second position.

21. The apparatus as set forth in claim 19 wherein:
a. said locating means includes (i) a first surface which engages said retaining means of said base means to restrict movement of said positioning means and said support assembly therewith in said first direction, and (ii) a second surface which engages said engaging means to restrict movement of said positioning means and said support assembly therewith in said second direction; and
b. said locating means is engaged between said retaining means and said engaging means so as to restrict said rotation of said locating means along said adjustment axis and to maintain said first selected distance between said positioning means first end and said locating means.

22. The apparatus as set forth in claim 21 wherein said retaining means includes a housing which is operatively connected to said wing and which has a first surface which is engaged by said first surface of said locating means to restrict movement of said positioning means and said support asssembly therewith in said first direction.

23. The apparatus as set forth in claim 22 wherein:
a. said positioning means includes an elongated member having a longitudinal axis which is coincident with said adjustment axis;
b. said locating means is rotatably engaged to said elongated member and includes an outwardly projecting shoulder portion which has an upper surface and a lower surface;
c. said housing is connected to said wing and has an upper portion which has an upper surface and a lower surface, said upper portion includes an opening therethrough along said adjustment axis and in communication with said upper and lower surfaces for receiving said locating member therethrough for axial movement of said locating member along said adjustment axis;
d. said engaging means includes an engaging member having an upper surface and a lower surface;
e. said base means includes means for moving said engaging member between said first position where said engaging member upper surface is disengaged from said shoulder portion lower surface, and a second position wherein said engaging member upper surface is engaged with said shoulder portion lower surface and said shoulder portion upper surface is engaged with said housing member upper portion lower surface to restrict to said rotation of said locating means along said adjustment axis and to maintain said first selected distance.

24. The apparatus as set forth in claim 23 wherein:
a. said engaging member has first and second angled side portions extending downwardly and inwardly from said engaging member upper surface;
b. said engaging member moving means includes:
  (1) first and second wedge members having complementary formed angled surfaces which engage said first and second angled side portions, respectively, and
  (2) means for moving said first and second wedge members along a tightening axis which is substantially perpendicular to said adjustment axis and against said first and second side portion angled surfaces, respectively, to cause said first and second engaging member side portions, respectively, to move relative to said first and second wedge portions, respectively, to reposition said engaging member between said first position and said second position.

* * * * *